United States Patent
Uchida et al.

(10) Patent No.: US 6,731,402 B1
(45) Date of Patent: May 4, 2004

(54) IMAGE PROCESSING METHOD AND DEVICE

(75) Inventors: Mitsuhiro Uchida, Minamiashigara (JP); Hisao Arai, Minamiashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/452,130

(22) Filed: Dec. 1, 1999

(30) Foreign Application Priority Data

Dec. 1, 1998 (JP) .......................................... 10-341583

(51) Int. Cl.$^7$ ................................................ H04N 1/40
(52) U.S. Cl. .................. 358/1.9; 358/487; 358/506; 358/3.21; 358/3.24
(58) Field of Search .................. 358/1.9, 3.23, 358/487, 506, 521, 3.01, 3.21, 3.24, 518; 355/32, 35

(56) References Cited

U.S. PATENT DOCUMENTS

| | | | |
|---|---|---|---|
| 4,448,521 A | * 5/1984 | Shiota | ........................... 355/77 |
| 5,405,738 A | 4/1995 | Uchida | ........................ 430/567 |
| 5,739,922 A | 4/1998 | Matama | ...................... 358/447 |
| 5,937,111 A | 8/1999 | Yamada | ...................... 382/308 |

FOREIGN PATENT DOCUMENTS

| | | | | |
|---|---|---|---|---|
| EP | 0 736 842 A1 | 3/1996 | ............. | G06T/5/40 |
| JP | 5-341417 | 12/1993 | | |
| JP | 8-272961 | 10/1996 | | |
| JP | 9-22460 | 1/1997 | | |
| JP | 9-91421 | 4/1997 | ............. | G06T/5/20 |
| JP | 9-248291 | 9/1997 | | |
| JP | 10-228400 | 8/1998 | ............ | G06F/12/00 |

* cited by examiner

*Primary Examiner*—Thomas D. Lee
(74) *Attorney, Agent, or Firm*—Sughrue Mion, PLLC (57) ABSTRACT

From a photosensitive material F, image data S1 is obtained together with the density Ds of the unexposed portion of the photosensitive material F. On the basis of this density Ds, the optimum characteristic curve for the photosensitive material F stored in the storing means 3 is modified by modifying means 4 to obtain a modified characteristic curve. In the storing means 3, a plurality of characteristic curves after the time lapse may be stored, and from these characteristic curves, a modified characteristic curve may be obtained. The modified characteristic curve is inputted to the transforming means 5, and on the basis of this, the image data S1 is transformed to provide processed image data S2. The processed image data S2 is reproduced as a print image K by the printing means 6.

15 Claims, 4 Drawing Sheets

IMAGE PROCESSING METHOD AND DEVICE

BACKGROUND OF THE INVENTION

1. Field of the Invention

The present invention relates to an image processing method and device for transforming the image data representing an image recorded on a photosensitive material, such as a color negative film, and a color reversal film, on the basis of the characteristic curve of the photosensitive material, to obtain processed image data.

2. Description of the Prior Art

Up to now, analog printers which imprint an image recorded on such a photosensitive material as a color negative film and a color reversal film on a photographic paper have been used. With such an analog printer, when the image recorded on a photosensitive material is over-exposed or under-exposed, the over-exposure or under-exposure cannot be corrected, and thus it has only been possible to obtain a print image with a low quality. On the other hand, digital printers, which read an image recorded on a photosensitive material to obtain digital image data, and by exposing the photographic paper on the basis of this image data, provides a print image have been used in recent years. With such a digital printer, the characteristic curve expressing the characteristics of a photosensitive material is stored as a one-dimensional look-up table (one-dimensional LUT), and the image data expressed by the densities of the image recorded on the photosensitive material is transformed with this one-dimensional LUT for providing a gray level correction, and thus, the over-exposure and the under-exposure can be corrected, which allows a higher-quality print image to be obtained than with an analog printer.

On the other hand, the advance of silver halide emulsion technology has allowed development of photosensitive materials having an extremely high sensitivity in recent years. Such a photosensitive material with high sensitivity has a drawback of that it offers excellent characteristics immediately after the manufacture, but it is susceptible to deterioration with time, such as fog due to a rise in the density of the unexposed portion and reduction in sensitivity, being affected by natural radioactive radiation and storage conditions, such as temperature and humidity. For such a photosensitive material, if deteriorated, providing appropriate gray level correction and graininess suppression treatments can improve the quality of a print image. However, with the above-mentioned technique which provides gray level correction by transforming the image data on the basis of the one-dimensional LUT which is used in compensation for over-exposure and under-exposure, gray level correction cannot be provided for a photosensitive material which has deteriorated with time with respect to a density rise. Also, for graininess suppression, the effect on a photosensitive material which has deteriorated is insufficient, and thus improvement has been demanded.

Therefore, the technique has been proposed which records information representing the characteristics of a photosensitive material, such as a gray patch, on the photosensitive material itself at the time of manufacture or before the development treatment, and in obtaining image data with a digital printer, acquires data representing the information in this gray patch portion to estimate the characteristic curve for the photosensitive material on the basis of this data, providing image processing for the image data.

However, for the above-stated method, which records a gray patch on the photosensitive material, a separate device for reading the gray patch information in addition to the image information is required, and further, the density of the gray patch must be recorded and read with accuracy, which makes the reading device for reading the image information large-sized and complicated, and as a result, increases the cost. In addition, when there is a difference between the elapsed period of time from when the user photographed the image and that from when the gray patch was recorded, the gray level correction is affected by the latent image preservability, and thus on the basis of the gray patch, it is impossible to provide an accurate gray level correction. Especially when the gray patch was recorded immediately after the manufacture of a photosensitive material, there is a great difference in latent image elapsed period of time between the gray patch and the photographed image, and thus, gray level correction carried out on the basis of the gray patch will have a substantially lowered accuracy.

The image outputting method according to the present invention is an image processing method which transforms image data obtained by reading an image recorded on a photosensitive material with a set characteristic curve corresponding to the photosensitive material to obtain processed image data, comprising the steps of:

acquiring elapsed time information concerning the elapsed time for the photosensitive material from the photosensitive material;

modifying the optimum characteristic curve for the photosensitive material on the basis of the elapsed time information to calculate a modified characteristic curve; and transforming the image data on the basis of the modified characteristic curve to obtain the processed image data.

Here, "a set characteristic curve corresponding to a photosensitive material" refers to the characteristic curve expressing the relationship between the exposure and the density for a photosensitive material. With the present invention, the exposure and the density for this characteristic curve are related to the image data and the processed image data, respectively, for transforming the image data.

"The optimum characteristic curve" refers to the characteristic curve expressing the relationship between the exposure and the density for a photosensitive material just after the manufacture, however, the term may refer to the characteristic curve for a photosensitive material at the time which can be regarded as that immediately after the manufacture (for example, at the time of shipment), although a certain period of time has elapsed from the manufacture.

"Elapsed time information concerning the elapsed time for a photosensitive material" includes information about the density of the unexposed portion of a photosensitive material, and the lot number of a photosensitive material. For the lot number of a photosensitive material, it is necessary to acquire information for relating the lot number to the date and time of manufacture of the photosensitive material having the lot number in advance. A photosensitive material may be provided with information allowing the date and time of manufacture of the photosensitive material to be identified (for example, information concerning the date of manufacture) so that it can be used as "elapsed time information concerning the elapsed time for a photosensitive material".

With the image processing method according to the present invention, it is preferable to calculate the modified characteristic curve also on the basis of the characteristic curve after the lapse of a set period of time in addition to the optimum characteristic curve.

Here, "the characteristic curve after the lapse of a set period of time" refers to the characteristic curve expressing the characteristics of a photosensitive material after the elapsed time period of one year or two years, for example.

It is preferable to provide grain suppression treatment for the processed image data in accordance with the breadth of the modification of the image information on the basis of the modified characteristic curve.

The image processing device according to the present invention is an image processing device which transforms image data obtained by reading an image recorded on a photosensitive material with a set characteristic curve corresponding to the photosensitive material to obtain processed image data, comprising:

an elapsed time information acquiring means for acquiring elapsed time information concerning the elapsed time for the photosensitive material from the photosensitive material;

a storing means which stores the optimum characteristic curve for the photosensitive material;

a modifying means for modifying the optimum characteristic curve on the basis of the elapsed time information to calculate a modified characteristic curve; and a transforming means for transforming the image data on the basis of the modified characteristic curve to obtain the processed image data.

With the image processing device according to the present invention, it is preferable that the storing means further store a characteristic curve after the lapse of a set period of time; and the modifying means be a means for calculating the modified characteristic curve also on the basis of the characteristic curve after the lapse of a set period of time in addition to the optimum characteristic curve.

Further, with the image processing device according to the present invention, it is preferable that it further comprise a grainness suppression treatment means for providing grainness suppression treatment for the processed image data in accordance with the breadth of the modification of the image information on the basis of the modified characteristic curve.

According to the present invention, from a photosensitive material, the elapsed time information for the photosensitive material is acquired, and on the basis of this elapsed time information, the optimum characteristic curve is modified to provide the modified characteristic curve, and thus, the processed image data which is provided by transforming the image data with this modified characteristic curve is that wherewith the deterioration with time of the photosensitive material is corrected. Therefore, the fog due to the rise in density and the deterioration of the sensitivity are reduced, and so, processed image data which allows reproduction of an image with a quality close to that by the proper exposure immediately after the manufacture can be obtained.

By obtaining the modified characteristic curve also on the basis of the characteristic curve after the time lapse in addition to the optimum characteristic curve, the modified characteristic curve which accommodates the deterioration with time of the photographic photosensitive material can be accurately produced, whereby processed image data which allows reproduction of an image with a quality close to that by the proper exposure immediately after the manufacture, being exactly compensated for the deterioration with time of the photographic photosensitive material can be obtained.

Further, if the breadth of the modification of the image data on the basis of the modified characteristic curve is great, there is a possibility of the grainness of the photographic photosensitive material also being enhanced, and so, with the present invention, grainness suppression treatment is provided for the image data in accordance with the breadth of the modification of the image data on the basis of the modified characteristic curve, so that processed image data which allows reproduction of a high-quality image with a suppressed grainness can be obtained.

SUMMARY OF THE INVENTION

The purpose of the present invention is to offer an image processing method and device which can provide a gray level correction which fully accommodates the deterioration with time of a photosensitive material.

DESCRIPTION OF THE PREFERRED EMBODIMENTS

Embodiments of the present invention will be explained with reference to the drawings.

Figure 1:
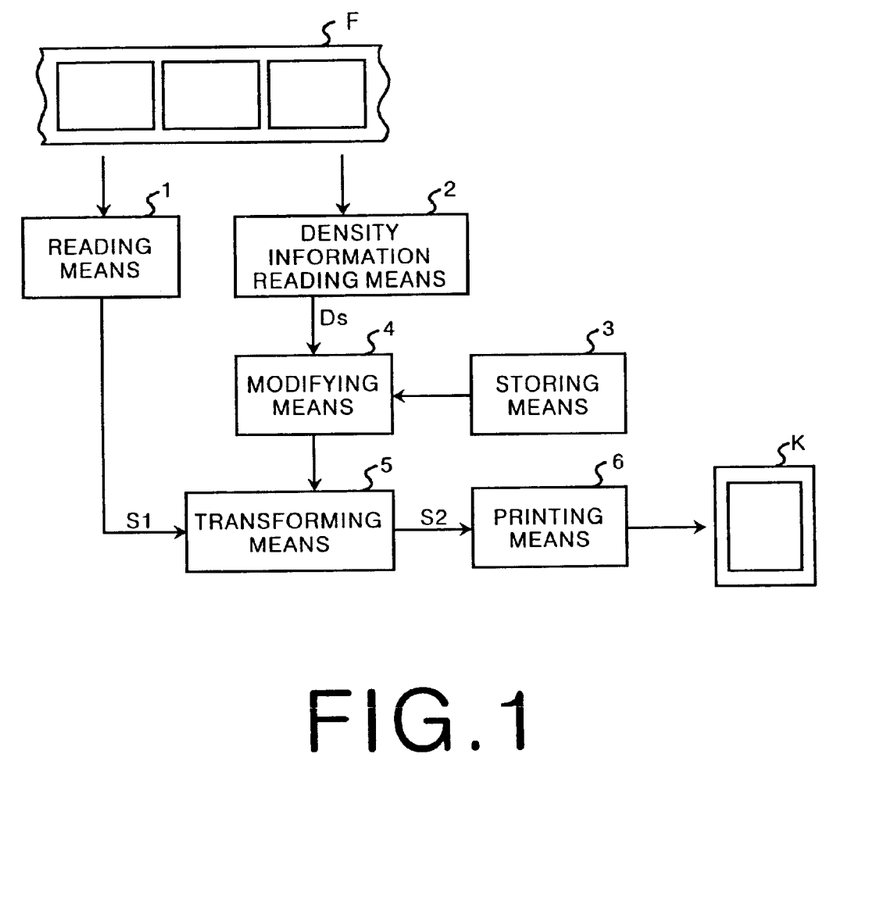
FIG. 1 shows a schematic block diagram illustrating a printing system to which an image processing device according to an embodiment of the present invention is applied.

FIG. 1 shows a schematic block diagram illustrating the configuration of a printing system to which an image processing device according to an embodiment of the present invention is applied. As shown in FIG. 1, this printing system comprises reading means 1 for obtaining image data S1 representing an image recorded on a photosensitive material (hereafter called photosensitive material F), such as a color negative film, and a color reversal film; density information acquiring means 2 for acquiring the density Ds of the unexposed portion of the photosensitive material F; storing means 3 which stores the optimum characteristic curve for providing a contrast transform for the image data S1 as a one-dimensional LUT; modifying means 4 for obtaining a modified characteristic curve by modifying the optimum characteristic curve on the basis of the density information Ds obtained on the density information acquiring means 2; transforming means 5 for obtaining processed image data S2 by transforming the image data S1 on the basis of the modified characteristic curve obtained on the modifying means 4; and printing means 6 for preparing a print image K on the basis of the processed image data S2.

Figure 2:
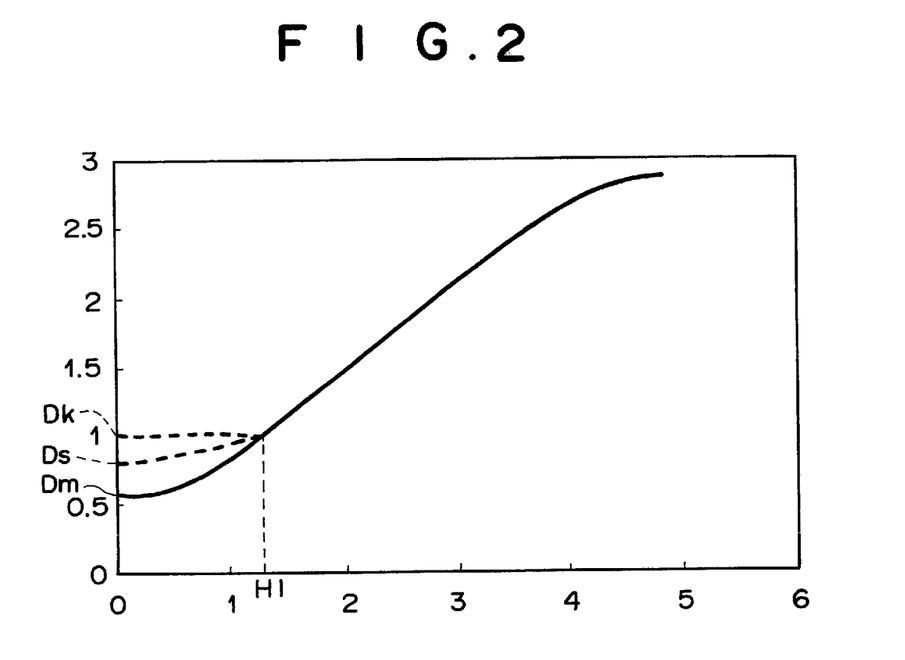
FIG. 2 shows a drawing illustrating a characteristic curve for a photosensitive material.

As shown with a full line in FIG. 2, the optimum characteristic curve for transforming of image data S1 is stored in the storing means 3. This optimum characteristic curve represents the characteristic curve for a photosensitive material F just after manufacture, or for a photosensitive material F at a time which can be regarded as that just after the manufacture (for example, at the time of shipment), although a certain period of time has elapsed from the manufacture. The example of optimum characteristic curve as shown in FIG. 2 is the optimum characteristic curve for the GL (green sensitive layer) for a color negative film having an ISO sensitivity of 1600 as mentioned in the sixth embodiment in Japanese Unexamined Patent Publication No. 5 (1993)-341417, expressing the relationship between the logarithmic value H of the exposure and the logarithmic value D of the density. With the present embodiment, the logarithmic value H of the exposure relates to the image data S1 read from the film F, while the logarithmic value D of the density to the processed image data S2. With such a characteristic curve for photosensitive material F, the density of the unexposed portion is raised due to a deterioration with time as shown with a dashed line in FIG. 2, resulting in a so-called fog being produced with the sensitivity being lowered, which means that if the image data S1 is used for printing as it is, the low density portion is lost, and thus no satisfactory prints can be produced. With the present invention, the optimum characteristic curve which is stored on the storing means 3 is modified to estimate the characteristic curve for a photosensitive material F which has deteriorated with time, and this characteristic curve is used as a modified one to prevent the contrast of the low density portion from being lost.

Figure 3:
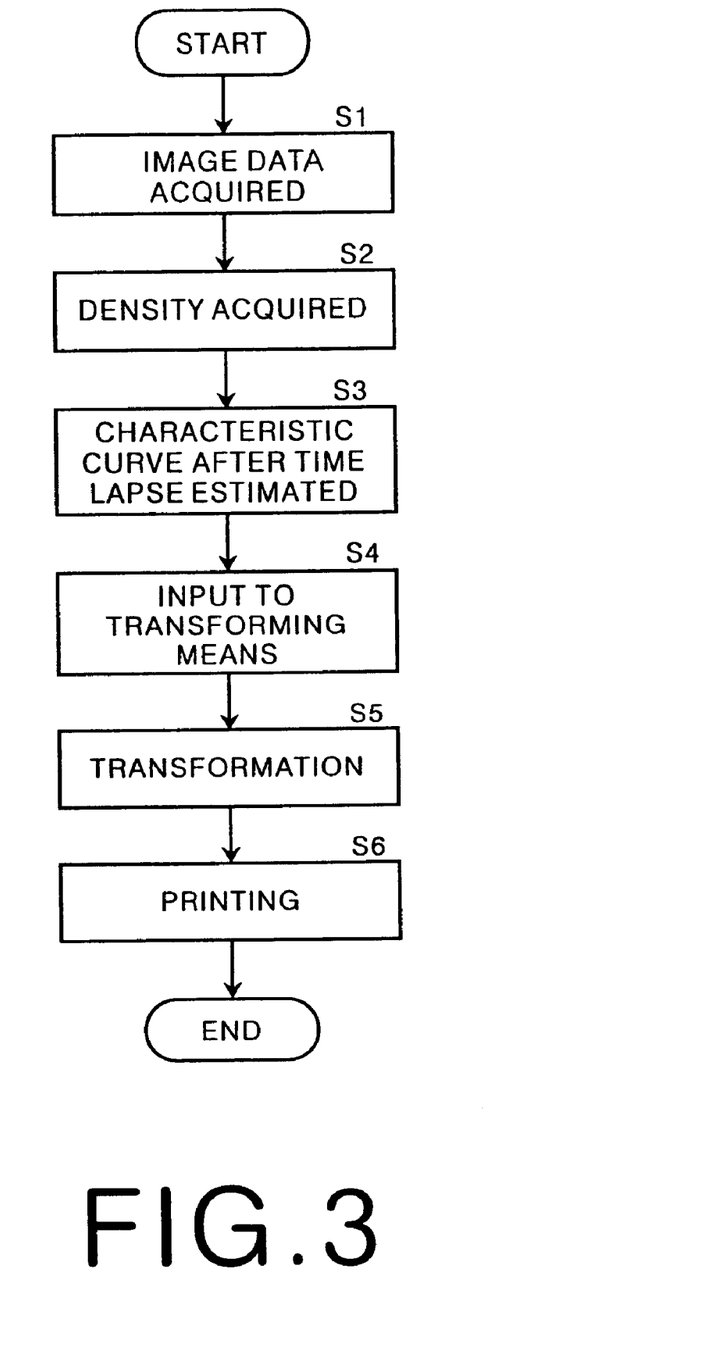
FIG. 3 shows a flowchart illustrating the function of the present embodiment.

Next, the function of the present embodiment will be explained. FIG. 3 shows a flowchart illustrating the function of the present embodiment. First, in the reading means 1, the image data S1 representing an image which is recorded on the photosensitive material F is acquired (step 1). Together with this, the density Ds of the unexposed portion of the photosensitive material F is acquired by the density information acquiring means 2 (step 2). Then, the optimum characteristic curve which is stored on the storing means 3 is read on the modifying means 4, and the characteristic curve after the time lapse is estimated on the basis of the density Ds (step 3). Hereinbelow, how the characteristic curve after the time lapse is estimated will be explained.

The optimum characteristic curve as shown in FIG. 2 is expressed by the equation (1):

$$D=F(H) \qquad (1)$$

F: Function for Optimum Characteristic Curve

From the lowest density for the optimum characteristic curve which is stored on the storing means 3, which is expressed as Dm in FIG. 2, and the density Ds, the exposure quantity H1 and the density Dk at the point where the characteristic curve after the time lapse intersects with the optimum characteristic curve are determined by using the following equations (2) and (3):

$$Dk=Dm+2\times(Ds-Dm) \qquad (2)$$

$$H1=F^{-1}(Dk) \qquad (3)$$

Then, by modifying the optimum characteristic curve so that, when $H \leq H1$, the following equation (4) is satisfied, and when $H > H1$, the following equation (5) is satisfied, the characteristic curve for the photosensitive material F after the time lapse, which is shown with a dashed line in FIG. 2, is estimated.

$$D'=Ds+(F(H)-Dm)/2(H \leq H1) \qquad (4)$$

$$D'=F(H)(H>H1) \qquad (5)$$

Table 1 below gives the fogs, the estimates of relative sensitivity, and the actual measurements of relative sensitivity for a particular type of photosensitive material before the time lapse and after the time lapse which has offered a Dm of 0.57 and a Ds of 0.8. As can be seen from Table 1, the characteristic curve for a photosensitive material F after the time lapse can be almost perfectly estimated on the basis of the above equations (4) and (5).

TABLE 1

|  | Fog | Relative sensitivity (estimate) | Relative sensitivity (actual measurement) |
| --- | --- | --- | --- |
| Photosensitive material before time lapse | 0.57 | 100 | 100 |
| Photosensitive material after time lapse | 0.77 | 60 | 57 |

The characteristic curve for the photosensitive material F after the time lapse thus obtained is inputted to the transforming means 5 as a modified characteristic curve (step 4). On the transforming means 5, the image data S1 is transformed to provide processed image data S2 on the basis of the modified characteristic curve (step 5). Here, the exposure for the modified characteristic curve relates to the image data S1, while the density to the processed image data S2. The processed image data S2 is inputted to the printing means 6, and a print image K is prepared on the basis of this processed image data S2 (step 6).

By using the above-stated photosensitive material having a characteristic curve as shown in FIG. 2, 100 scenes were photographed, and for the photosensitive material before the time lapse, prints were produced with an optical printer, while for the photosensitive material before the time lapse, prints were produced with an optical printer and an optical printer which performs image processing on the basis of the modified characteristic curve as stated above. For the three sets of 100 different prints thus obtained, 20 subjects were requested to select preferable prints for conducting an organoleptic test. The results of the organoleptic test are given in Table 2. From these results, it has been confirmed that, when a photosensitive material after the time lapse which has been subjected to image processing by the technique of the present invention is used, a much greater quantity of preferable prints can be produced than when a photosensitive material after the time lapse which has been subjected to no processing is used. Further, although there is deterioration with time, a photosensitive material after the time lapse which has been subjected to image processing by the technique of the present invention also allows a much greater quantity of preferable prints to be produced than a photosensitive material before the time lapse.

TABLE 2

|  | Printing method | Percentage of selection |
| --- | --- | --- |
| Photosensitive material before time lapse | Optical printer | 12.2% |
| Photosensitive material after time lapse | Optical printer | 5.3% |
| Photosensitive material after time lapse | Printing system according to present invention | 82.5% |

Figure 4:
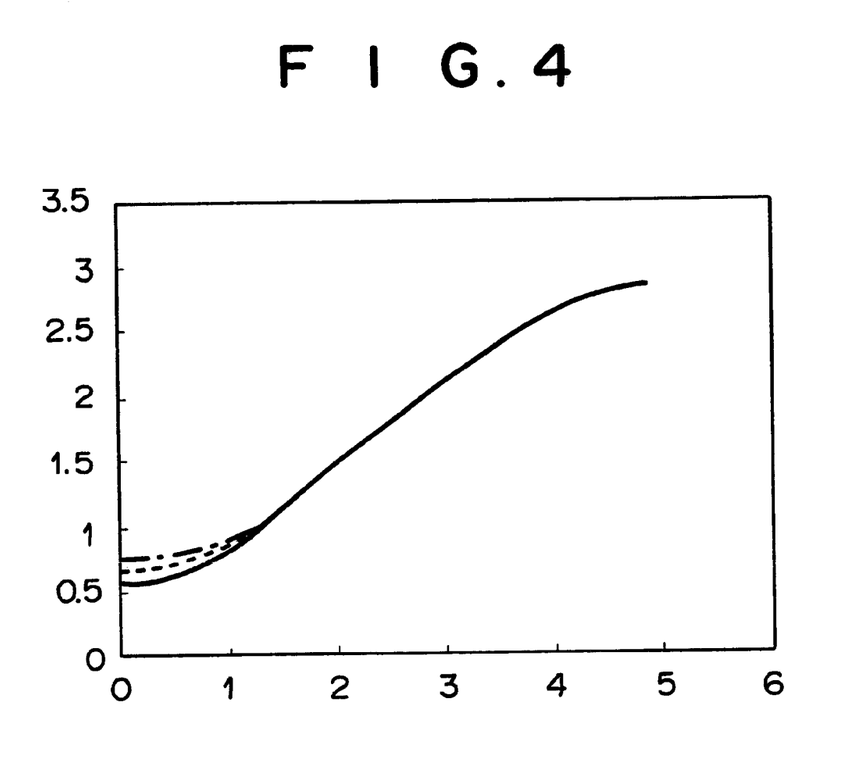
FIG. 4 shows a drawing illustrating a characteristic curve for a photosensitive material.

Next, a second embodiment of the present invention will be described. With the second embodiment, as shown in FIG. 4, together with the optimum characteristic curve (shown with a full line) for a photosensitive material F, the characteristic curve (shown with a dashed line) after an elapsed time period of one year, for example, and that (shown with an alternate long and short dash line) after an elapsed time period of two years are stored on the storing means 3, and the modified characteristic curve is determined on the basis of these plurality of characteristic curves. Specifically, the density Ds of the unexposed portion of a photosensitive material F is determined as with the first embodiment, and from the lowest density Dm for the optimum characteristic curve, the lowest densities Dm1 and Dm2 for the characteristic curves after elapsed time periods of one year and two years, respectively, and the density Ds, the characteristic curve is determined by interpolation on the basis of the following equation (6) or (7):

When Dm<Ds<Dm1, $$Dk=F(H)+(F1(H)-F(H))\times(Ds-Dm)/(Dm1-Dm) \quad (6)$$

When Dm1<Ds<Dm2, $$Dk=F1(H)+(F2(H)-F1(H))\times(Ds-Dm1)/(Dm2-Dm1) \quad (7)$$

When Dm2<Ds, the characteristic curve for a photosensitive material F is determined, as with the first embodiment, by referencing the characteristic curve after an elapsed time period of two years.

Thus, by storing the characteristic curves after elapsed time periods of one year and two years together with the optimum characteristic curve on the storing means 3, and estimating the characteristic curve for a photosensitive material F to be image-processed on these characteristic curves, the characteristic curve for the photosensitive material F after the time lapse can be estimated more accurately than with the first embodiment. Thus, by transforming the image data S1 with the use of the estimated characteristic curve as a modified characteristic curve, a more preferable print image K can be obtained.

With the above-stated first and second embodiments, when the modified characteristic curve is used to transform the image data S1, the higher the degree of modification in the low density portion of the characteristic curve, the more conspicuous the graininess of the photosensitive material, resulting in the print image obtained being more difficult to view. Therefore, with the present embodiment, it is preferable to provide graininess suppression treatment for the processed image data S2. Hereinbelow, methods for suppressing the graininess will be explained.

First, the method as described in Japanese Unexamined Patent Publication No. 9 (1997)-22460, for example, provides sharpness enhancing treatment for the processed image data S2 to give image data f1. The technique of sharpness enhancing treatment as stated in Japanese Unexamined Patent Publication No. 9 (1997)-22460, decomposes the image data into the low-frequency component, intermediate-frequency component, and high-frequency component to provide an enhancing and suppressing treatment which enhances the high-frequency component, while suppressing the intermediate-frequency component, and synthesizes the frequency components after being subjected to the enhancing and suppressing treatment. The low-frequency component, giving image data f1 representing an image having its high-frequency component, is enhanced, while having its intermediate-frequency component suppressed. The technique of sharpness enhancing treatment is not limited to this, and it may be the unsharp masking treatment, the high-pass filter treatment or other.

Another method for suppressing the graininess provides morphology treatment for the processed image data S2 for giving image data f2 representing an image with a suppressed graininess. The morphology treatment is mentioned in Japanese Unexamined Patent Publication Nos. 8 (1996)- 272961, 9 (1997)-248291, 9 (1997)-91421, for example. It suppresses the variation of the processed image data S2 by providing opening treatment and closing treatment. Here, the opening treatment and the closing treatment differ from each other in the order of providing dilation treatment and erosion treatment. The dilation treatment is a treatment in which the maximum value within the range of ±m (the value determined according to the structural element) about the pixel of interest is searched, while the erosion treatment is a treatment in which the minimum value within the range of ±m about the pixel of interest is searched. The opening treatment is a treatment in which the erosion treatment is followed by the dilation treatment, i.e., search for the minimum is followed by a search for the maximum, while the closing treatment is a treatment in which the dilation treatment is followed by the erosion treatment, i.e., search for the maximum is followed by search for the minimum. Therefore, the opening treatment smoothes the density curve for the processed image data S2 from the low density side, suppressing the convex density-varying portion (the portion which is higher in density than the surrounding portion) where the density varies in the range spatially narrower than the mask size 2m. On the other hand, the closing treatment smoothes the density curve from the high density side, suppressing the concave density-varying portion (the portion which is lower in density than the surrounding portion) where the density varies in the range spatially narrower than the mask size 2m.

With the present embodiment, by finding the average of the opening treatment-subjected signal and the closing treatment-subjected signal obtained by providing the opening treatment and the closing treatment for the processed image data S2, image data f2 in which the graininess is suppressed is obtained. The method which selectively makes a weighted-addition of an opening treatment-subjected signal to a closing treatment-subjected signal, which is mentioned in Japanese Patent Application No. 10 (1998)-228400, for example, may be used to obtain image data f2 in which the graininess is suppressed.

The method of graininess suppression treatment for use with the present embodiment is not limited to these, and it may be the median filter treatment, the hysteresis smoothing treatment, the noise repetition removal treatment, or other.

With the present embodiment, by making a weighted-addition of the image data f1 to the image data f2 with pixels being related to each other, processed image data fout which has been finally subjected to a graininess suppression treatment is obtained. In detail, the weighting factor for the image data f1 and the image data f2 is set in accordance with the degree of modification of the optimum characteristic curve. Specifically, in making a weighted-addition as expressed by the following equation, the weighting factor a can be set as expressed by the equation (9) with the degree of modification of the optimum characteristic curve being taken into account. In the equation (8), the image data S1 is expressed as fin.

$$fout=\alpha[fin]\cdot t\cdot f1+(1-\alpha[fin]\cdot t)\cdot f2 \quad (8)$$

provided that $$t=|f1-fin|/(|f1-fin|+|f2-fin|\alpha[i]=(D'[i+1]-D'[i-1]/(D[i+1]-D[i-1]) \quad (9)$$

If the value of the image data f1 is j, D[j] and D'[j] are the output values on the optimum characteristic curve and the modified characteristic curve, respectively, and thus the right side of the equation (9) expresses the ratio of the slope of the modified characteristic curve to that of the optimum characteristic curve when the value of the image data f1 is i. As shown in FIG. 2, the slope of the optimum characteristic curve is larger than that of the modified characteristic curve, and the ratio of the slope is decreased as the degree of modification is increased. Therefore, the value of $\alpha[i]$ which can be found from the equation (9) is decreased as the degree of modification is increased, and approaches 1 as the degree of modification is decreased. Thus, by making a computation as expressed by the equation (8) on the basis of the weighting factor a set with the equation (9), processed image data fout can be obtained which represents an image in which, for the portion where the degree of modification is high, the value of $\alpha$ is decreased, resulting in the degree of graininess suppression being higher than that of sharpness enhancement, while, for the remaining portion, the value of a approaches 1, resulting in the degree of sharpness enhancement being higher than that of graininess suppression.

With the first and second embodiments, the characteristic curve after the time lapse is estimated on the basis of the density of the unexposed portion of a photosensitive material F, although, it may be estimated by, for example, acquiring a table giving the date of manufacture for a particular lot number of photosensitive material F from the manufacturer of photosensitive materials through the network, and storing it in the storing means 3; reading the lot number recorded on the photosensitive material F when processing it; referring to the table stored on the storing means 3 to determine the elapsed time period from the date of manufacture; and on the basis of the elapsed time period determined, modifying the characteristic curve before the time lapse which is stored in the storing means 3. Methods for determining the elapsed time period other than that which uses the lot number of the photosensitive material include a method which reads information indicating the date of manufacture which is optically stored on the photosensitive material beforehand or which is in the magnetic storing section of a film (APS film) capable of recording magnetic information.

What is claimed is:

1. An image processing method which transforms image data obtained by reading an image recorded on a photosensitive material with a set characteristic curve corresponding to said photosensitive material to obtain processed image data, comprising the steps of:

acquiring elapsed time information concerning the elapsed time for the photosensitive material from said photosensitive material;

modifying the optimum characteristic curve for said photosensitive material on the basis of the elapsed time information to calculate a modified characteristic curve; and transforming said image data on the basis of the modified characteristic curve to obtain said processed image data.

2. An image processing method according to claim 1, wherein said modified characteristic curve is calculated also on the basis of the characteristic curve after the lapse of a set period of time in addition to said optimum characteristic curve.

3. An image processing method according to claim 1, wherein said elapsed time information is information concerning the density of the unexposed portion of said photosensitive material.

4. The method of claim 1, wherein the density measurement taken is for a green color density.

5. The method of claim 1, wherein the elapsed time information relates to time variation of a gradient of a characteristic curve.

6. The method of claim 1, wherein the acquiring of elapsed time information corresponds to acquiring of density measurements from fewer than three different colors.

7. An image processing method which transforms image data obtained by reading an image recorded on a photosensitive material with a set characteristic curve corresponding to said photosensitive material to obtain processed image data comprising the steps of:

acquiring elapsed time information concerning the elapsed time for the photosensitive material from said photosensitive material;

modifying the optimum characteristic curve for said photosensitive material on the basis of the elapsed time information to calculate a modified characteristic curve; and transforming said image data on the basis of the modified characteristic curve to obtain said processed image data, wherein graininess suppression treatment is provided for said processed image data in accordance with the extent of the modification of said image information on the basis of said modified characteristic curve.

8. An image processing method which transforms image data obtained by reading an image recorded on a photosensitive material with a set characteristic curve corresponding to said photosensitive material to obtain processed image data, comprising the steps of:

acquiring elapsed time information concerning the elapsed time for the photosensitive material from said photosensitive material;

modifying the optimum characteristic curve for said photosensitive material on the basis of the elapsed time information to calculate a modified characteristic curve; and transforming said image data on the basis of the modified characteristic curve to obtain said processed image data, wherein said elapsed time information is the lot number of the photosensitive material and information for relating the lot number to the date and time of manufacture of the photosensitive material, or information concerning the date and time of manufacture of the photosensitive material.

9. An image processing method which transforms image data obtained by reading an image recorded on a photosensitive material with a set characteristic curve corresponding to said photosensitive material to obtain processed image data, comprising the steps of:

acquiring elapsed time information concerning the elapsed time for the photosensitive material from said photosensitive material;

modifying the optimum characteristic curve for said photosensitive material on the basis of the elapsed time information to calculate a modified characteristic curve; and transforming said image data on the basis of the modified characteristic curve to obtain said processed image data, wherein said elapsed time information is information concerning the density of the unexposed portion of said photosensitive material, wherein, when said optimum characteristic curve is expressed by the equation (1):

$$D=F(H) \qquad (1)$$

F: Function for optimum characteristic curve from the density of the unexposed portion of said photosensitive material, which is assumed to be Ds, and the lowest density for said optimum characteristic curve, which is assumed to be Dm, the exposure quantity H1 and the density Dk at the point where said modified characteristic curve intersects with said optimum characteristic curve are determined by using the following equations (2) and (3):

$$Dk = Dm + 2 \times (Ds - Dm) \quad (2)$$

$$H1 = F^{-1}(Dk) \quad (3)$$

then, by modifying said optimum characteristic curve so that, when H≦H1, the following equation (4) is met, and when H>H1, the following equation (5) is met, $$D' = Ds + (F(H) - Dm)/2 \quad (H \leq H1) \quad (4)$$

$$D' = F(H) \quad (H > H1) \quad (5)$$

said modified characteristic curve is obtained.

10. An image processing device which transforms image data obtained by reading an image recorded on a photosensitive material with a set characteristic curve corresponding to said photosensitive material to obtain processed image data, comprising:

elapsed time information acquiring means for acquiring elapsed time information concerning the elapsed time for the photosensitive material from said photosensitive material;

memory means which stores the optimum characteristic curve for said photosensitive material;

modifier means for modifying said optimum characteristic curve on the basis of said elapsed time information to calculate a modified characteristic curve; and transformer means for transforming said image data on the basis of the modified characteristic curve to obtain said processed image data.

11. An image processing device according to claim 10, wherein said memory means further stores a characteristic curve after the lapse of a set period of time; and said modifier means is means for calculating said modified characteristic curve also on the basis of the characteristic curve after the lapse of a set period of time in addition to said optimum characteristic curve.

12. The apparatus of claim 10, wherein the density measurement taken is for a green color density.

13. The apparatus of claim 10, wherein the elapsed time information relates to time variation of a gradient of a characteristic curve.

14. The apparatus of claim 10, wherein the elapsed time information acquiring means acquires density measurements from fewer than three different colors.

15. An image processing device which transforms image data obtained by reading an image recorded on a photosensitive material with a set characteristic curve corresponding to said photosensitive material to obtain processed image data, comprising:

elapsed time information acquiring means for acquiring elapsed time information concerning the elapsed time for the photosensitive material from said photosensitive material;

memory means which stores the optimum characteristic curve for said photosensitive material;

modifier means for modifying said optimum characteristic curve on the basis of said elapsed time information to calculate a modified characteristic curve; and transformer means for transforming said image data on the basis of the modified characteristic curve to obtain said processed image data, further comprising graininess suppression treatment means for providing graininess suppression treatment for said processed image data in accordance with the extent of the modification of said image information on the basis of said modified characteristic curve.

* * * * *